US007194898B2

(12) United States Patent
Machida et al.

(10) Patent No.: US 7,194,898 B2
(45) Date of Patent: Mar. 27, 2007

(54) STROKE DETERMINATION UNIT AND METHOD OF MEASURING STROKE IN A MULTI-CYLINDER FOUR-CYCLE ENGINE

(75) Inventors: Kenichi Machida, Saitama (JP); Masashi Saito, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/389,324

(22) Filed: Mar. 24, 2006

(65) Prior Publication Data

US 2006/0218998 A1 Oct. 5, 2006

(30) Foreign Application Priority Data

Mar. 29, 2005 (JP) ............................ 2005-095600

(51) Int. Cl.
*G01M 15/00* (2006.01)

(52) U.S. Cl. .................................................... 73/117.3

(58) Field of Classification Search .................. 73/116, 73/117.2, 117.3, 118.1; 340/439; 701/29, 701/101

See application file for complete search history.

(56) References Cited

U.S. PATENT DOCUMENTS 4,889,094 A 12/1989 Beyer et al.
5,321,979 A 6/1994 Mc Kendry et al.
6,170,322 B1 * 1/2001 Yamazaki et al. ......... 73/117.3
6,340,020 B2 * 1/2002 Yamazaki et al. .......... 123/478
6,378,358 B1 * 4/2002 Hirakata et al. ........... 73/117.3
6,575,136 B1 * 6/2003 Namari .................. 123/406.58
6,935,168 B2 * 8/2005 Shimoyama ............... 73/117.3
2001/0010218 A1 8/2001 Yamazaki et al.
2002/0170346 A1 11/2002 Shimoyama
2005/0205057 A1 9/2005 Yamashita
2006/0116813 A1 * 6/2006 Tsuyuguchi et al. ........ 701/114

FOREIGN PATENT DOCUMENTS

EP 1609975 12/2005
JP 10-227252 8/1998
WO WO 2004013476 2/2004

* cited by examiner

*Primary Examiner*—Eric S. McCall
(74) *Attorney, Agent, or Firm*—Carrier Blackman & Associates, P.C.; Joseph P. Carrier; William D. Blackman

(57) ABSTRACT

A stroke determination unit for a 4-cycle engine uses intake pressure as a parameter to provide accurate stroke determination. A combined pressure combines the detected pressures of intake ports of the first to third cylinders, and stroke determination is carried out by recognizing, within a combined pressure waveform based on a detection value for the combined pressure, shapes of the combined pressure waveform for a specified phase period of a crankshaft. The pressure pattern recognition is carried out by storing variation patterns of pressure values measured within the specified crankshaft phase period, and collating patterns with a data map stored within an ECU. Alternatively, the pattern recognition is carried out by collating with condition equations representing "rising" or "upward peak". With the latter, pressure variation due to contamination such as electrical noise to the pressure sensor is made negligible, and noise suppression of the stroke determination unit is improved.

18 Claims, 9 Drawing Sheets

FIG. 7A

| signal pattern No. | Pb variation generation stage count 6 | 7 | 8 | 9 | 10 | 11 |
|---|---|---|---|---|---|---|
| 0 | +1 | +1 | +1 | +1 | +1 | +1 |
| 1 | +1 | +1 | +1 | +1 | +1 | −1 |
| 2 | +1 | +1 | +1 | +1 | −1 | −1 |
| 3 | +1 | +1 | +1 | −1 | −1 | −1 |
| 4 | +1 | +1 | −1 | −1 | −1 | −1 |
| 5 | +1 | −1 | −1 | −1 | −1 | −1 |
| 6 | +1 | +1 | +1 | +1 | 0 | −1 |
| 7 | +1 | +1 | +1 | 0 | −1 | −1 |
| 8 | +1 | +1 | 0 | −1 | −1 | −1 |
| 9 | +1 | 0 | −1 | −1 | −1 | −1 |

FIG. 7B

| signal pattern No. | Pb pattern determination |
|---|---|
| 0 | rising |
| 1~9 | upward peak |
| other than 0 - 9 | undetermined |

STROKE DETERMINATION UNIT AND METHOD OF MEASURING STROKE IN A MULTI-CYLINDER FOUR-CYCLE ENGINE

CROSS-REFERENCE TO RELATED APPLICATIONS

The present invention claims priority under 35 USC 119 based on Japanese patent application No. 2005-095600, filed on Mar. 29, 2005. The subject matter of these priority documents is incorporated by reference herein.

BACKGROUND OF THE INVENTION

1. Field of the Invention

The present invention relates to a stroke determination unit, and to a method of measuring stroke in a 4-cycle internal combustion engine. More particularly, the present invention relates to a stroke determination unit and method, suitable for determining stroke in a multiple cylinder 4-cycle engine.

2. Description of the Background Art

In a conventional 4-cycle engine that has adopted an electronic fuel injection unit, stroke determination may be performed based on both the phase of an engine camshaft and the phase of a crankshaft. In Japanese Patent Laid-open no. Hei. 10-227252, a stroke determination unit is proposed that does not detect the phase of a camshaft, but instead, for a particular crankshaft phase, compares intake pressure detected at a current time and intake pressure detected at a prior period, and carries out stroke determination according to a magnitude relationship of the two. In this way, since it is not necessary to provide a sensor for detecting the camshaft phase inside a cylinder head of the engine, it is possible to make the engine smaller and lighter in weight.

However, with the technology disclosed in Japanese Patent Laid-open no. Hei. 10-227252 described above, stroke determination takes a long time to effect, because stroke determination is carried out based on a magnitude relationship of measured intake pressures obtained using an intake pressure sensor, taking a magnitude relationship for all intake pressures into consideration, from a low-speed region of an internal combustion engine to a high-speed region. Also, since the comparison of magnitude values is made for a particular point, it is difficult to improve noise suppression with respect to the influence of interference, such as noise on an electrical system.

SUMMARY OF THE INVENTION

The present invention is designed to solve the above described problems of the related art. In an illustrative embodiment hereof, the present invention provides a stroke determination unit and method for a 4-cycle engine in which stroke determination setting is simplified, and which is capable of improving suppression of the effect of electrical noise. The stroke determination unit and method hereof use intake pressure as a parameter, in combination with a reading from a crankshaft sensor.

In a first aspect of the present invention, a stroke determination unit for a multiple cylinder, 4-cycle engine, includes a crank angle detection device for detecting a phase of a crankshaft, and an intake pressure detection device for detecting intake pressures of cylinders provided with an intake pressure variation generating device. The intake pressure variation generating device causes variation so that an intake pressure waveform of at least one cylinder becomes different relative to the intake pressure waveforms of other cylinders.

The stroke determination unit also includes an intake pressure waveform combining device for combining detected intake pressure waveforms, a pattern recognition device for recognizing a pattern of the detected intake pressure waveform, and a stroke determination device for determining a stroke of each cylinder, based on the sensed crankshaft phase and a recognized pattern.

In a second aspect of the present invention, the pattern recognition device recognizes a pattern only in a specified crankshaft phase period.

In a third aspect of the present invention, the specified crankshaft phase period is set so that an inflection point of the combined intake pressure waveform is close to a start time of the specified crankshaft phase period.

In a fourth aspect of the present invention, the multiple cylinder engine is an engine timed to fire at regular intervals and having expansion strokes at equal spacing, and the intake pressure variation generating device does not add an intake pressure waveform for a particular cylinder to a combined intake pressure waveform.

In a fifth aspect of the present invention, detection of the intake pressure for the particular cylinder is not carried out, and fuel injection or ignition timing control is performed based on intake pressure detected for cylinders other than the particular cylinder.

In a sixth aspect of the present invention, the intake pressure variation generating device changes the sensitivity of the intake pressure detection for a particular cylinder in the intake pressure detection device arranged for each cylinder.

In a seventh aspect of the invention, the pattern recognition device identifies fluctuation in the combined intake pressure waveform for every crank pulse generation period as one of increase, decrease or change, and recognizes a pattern of the combined intake pressure waveform using the fluctuation result.

In an eighth aspect of the present invention, the pattern recognition device stores a plurality of intake pressure values including start time and end time of the specified crankshaft phase period, and recognizes a pattern of the combined intake pressure waveform from a relationship between the intake pressure values at the start time and the end time, and other intake pressure values within that range.

According to the first aspect of the invention, setting the same pattern from a low-speed region to a high-speed region is easy because, in contrast to a method where combined intake pressure values for particular phase of the crankshaft are compared, variation of a combined intake pressure waveform is recognized using a waveform pattern having continuity, and it is also possible to accurately determine engine stroke with improved suppression of electrical noise.

According to the second aspect of the invention, since only a pattern of a particular period having a feature is recognized in a combined intake pressure waveform, it is possible to reduce the computing load on a computer, due to the use of pattern recognition, as compared to a method that carries out recognition processing in all periods of the crankshaft.

According to the third aspect of the invention, since no stray curve points of the combined intake pressure waveform appear outside the specified crankshaft phase period, even if by some chance a delay arises at the time of detection of negative intake pressure, in cases such as where the crankshaft is rotating at high speed, there is no erroneous pattern recognition, and it is possible to carry out accurate stroke determination.

According to the fourth aspect of the invention, even with an engine timed to fire at regular intervals, it is possible to cause necessary variation for stroke determination in an intake pressure waveform without using a separate unit, etc.

According to the fifth aspect of the invention, since it is not necessary to provide an intake pressure detection device in a particular cylinder, it is possible to reduce the number of components and manufacturing steps.

According to the sixth aspect of the invention, it is possible to cause variation in the intake pressure waveform without the addition of a significant change to the intake pressure detection device provided for every cylinder.

According to the seventh aspect of the invention, since pattern recognition is carried out using recognition results for three simple fluctuating patterns, it is possible to carry out accurate stroke determination, with improved pattern recognition precision, in all engine operating states.

According to the eighth aspect of the invention, since fluctuation in intake pressure measurement values that are caused to be estimated due to the occurrence of noise etc. are ignored, it is possible to improve suppression of the effect of electrical noise and carry out accurate stroke determination.

Modes for carrying out the present invention are explained below by reference to an embodiment of the present invention shown in the attached drawings. The above-mentioned object, other objects, characteristics and advantages of the present invention will become apparent form the detailed description of the embodiment of the invention presented below in conjunction with the attached drawings.

BRIEF DESCRIPTION OF THE DRAWINGS

FIG. 7 is a data map for Pb pattern recognition processing relating to the first embodiment of the present invention.

DETAILED DESCRIPTION

Selected illustrative embodiments of the invention will now be described in some detail, with reference to the drawings. It should be understood that only structures considered necessary for clarifying the present invention are described herein. Other conventional structures, and those of ancillary and auxiliary components of the system, are assumed to be known and understood by those skilled in the art.

Figure 1:
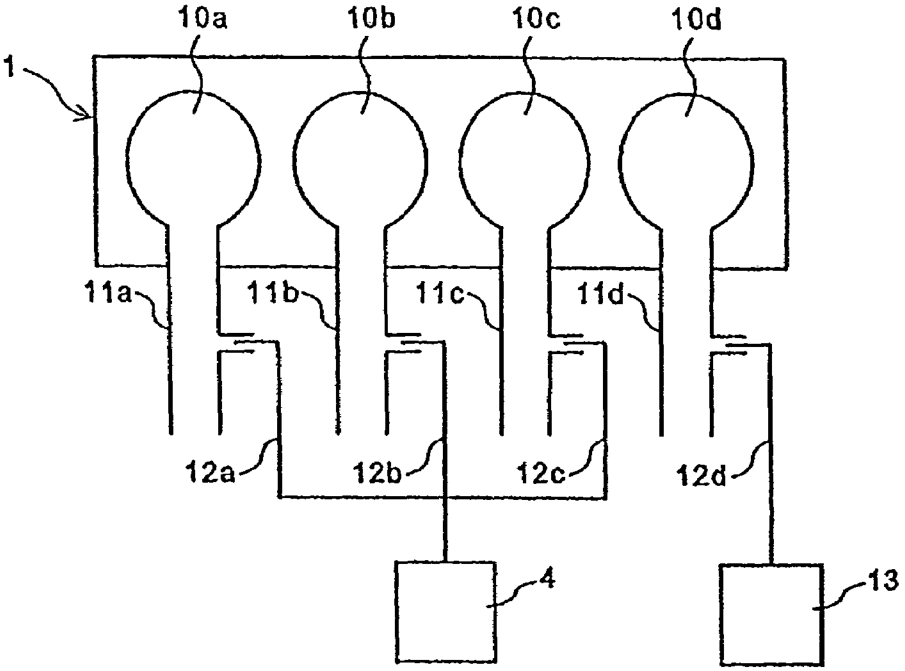
FIG. 1 is a schematic diagram of an engine and an intake pressure sensor suitable for application to the present invention.

FIG. 1 is a schematic diagram of a four-cycle four-cylinder engine 1, and an intake pressure sensor 4, 13 suitable for use in the present invention. First through fourth cylinders 10*a*–10*d* of the engine 1 are constructed so that one end of respectively separate capillaries 12*a*–12*d* communicates with respective intake pipes 11*a*–11*d* leading to cylinder intake ports.

An intake pressure (Pb) sensor 4, corresponding to an intake pressure variation generating device, is constructed so as to detect combined intake pressure Pb. The combined intake pressure Pb is a combination of intake pressures P1, P2 and P3 generated in the first to third intake pipes 11*a*–11*c*, obtained by merging the other ends of the first to third capillaries 12*a*–12*c*. A second Pb sensor 13 for measuring intake pressure P4 generated in the intake pipe 11*d* of the fourth cylinder is connected to an end section of the capillary 12*d*. However, it is possible to omit this structure as long as it is possible to execute stroke determination on the basis of measurement values of the combined intake pressure Pb to carry out control for fuel injection and ignition timing.

The structure described above, in which a combined value of intake pressure is measured in only three of four cylinders, is advantageous for the following reason. If a combined value of intake pressure for all four cylinders generated in intake pipes of an engine timed to fire at regular intervals is measured, then in one full cycle of the engine (that is, two rotations of the crankshaft), an intake pressure waveform will be the same for the first crankshaft rotation and the second crankshaft rotation, and so there is nothing that can be used for stroke determination. This problem is avoided by measuring a combined value of intake pressure in only three of four cylinders.

With the intake pressure variation generating device of this embodiment, since an intake pressure value for the fourth cylinder is excluded, as will be clear from subsequent description, variation is imparted to the combined intake pressure Pb waveform for the first and second rotations of the crankshaft, and stroke determination is possible. In the case of a multiple cylinder engine where combustion intervals are different, since the intake pressure negative pressure waveform for each cycle is not periodic, it can be used as it is, or it is possible to impart variation to some cylinders or to impart new characteristics on the negative pressure waveform.

Figure 2:
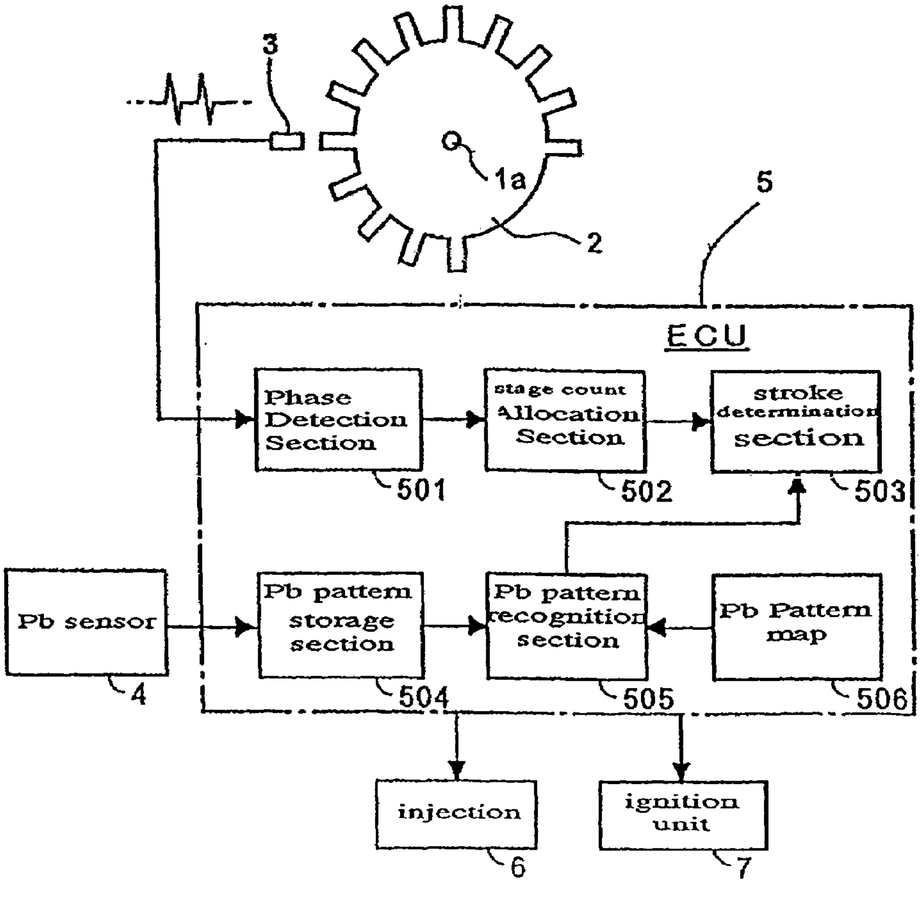
FIG. 2 is a block diagram of one embodiment of a stroke determination unit for an engine of the present invention.

FIG. 2 is a block diagram of one embodiment of a stroke determination unit suitable for use in the Pb sensor having the structure of FIG. 1. In the stroke determination unit of FIG. 2, a crank pulser rotor 2 is provided on the crankshaft 1*a* of the engine 1, and cooperates with a pulse generator 3 to form a phase sensor pair which outputs thirteen crank pulses per rotation of the crankshaft. The crank pulser rotor 2 contains thirteen projections arranged at spaced intervals of 22.5 degrees, and a non-toothed section, where an angle occupied by the non-toothed section is 90 degrees.

During engine operation, crank pulses from operation of the phase sensor pair, and an output signal of the Pb sensor 4 are input to an engine control unit (ECU) 5, together with other sensor signals and process signals.

The ECU 5 includes a phase detection section 501, corresponding to a crank angle detection device for detecting phase of the crankshaft based on the crank pulses, and a stage counter allocation section 502 for dividing one rotation of a crankshaft 1 by 13 at the output timing of the crank pulses and allocating stage numbers of "#1" to "#13" to respective phases (stages) of the crankshaft. The ECU 5 also includes a Pb pattern storage section 504, for storing variation patterns of the combined intake pressure Pb detected by the Pb sensor 4. The ECU 5 further includes a Pb pattern recognition section 505, corresponding to a pattern recognition device, for recognizing a Pb pattern by referencing data held in a stored Pb pattern map 506. The ECU 5 also includes a stroke determination section 503, corresponding to a stroke determination device, for determining stroke of the engine 1 based on stage count allocation results and Pb pattern recognition results. The ECU 5 controls an injection 6 of fuel by a fuel injector, and operation of an ignition unit 7, based on output timing of the crank pulses and stroke determination results.

Next, a method of stroke determination processing executed by the ECU 5 will be described, with reference to the flow chart of FIG. 3 and the timing chart of FIG. 4. When the ECU 5 begins to count down a number of pulses of the crank pulser rotor 2, "stroke determination processing" (main flow) shown in the flowchart of FIG. 3 is initiated.

In step S1, if a crank pulse is detected, then in step S2 it is determined whether or not a crank reference position is being defined. With respect to the crank reference position, as shown in the timing chart of FIG. 4, if fifteen crank pulses are detected, since the non-toothed section of the crank pulser rotor 2 must have passed by during this time, the position of the non-toothed section can be defined as the crank reference (base) position. Continuing on, in step S3, it is determined whether or not the stroke has been determined. Here, since the stroke is not yet determined, processing advances to step S4, and it is determined whether or not stroke determination is in progress. If it is determined in step S4 that stroke determination has not commenced, processing advances to step S5 and it is determined whether or not the stage count is N1. The value of N1 is a setting value for what stage count Pb pattern recognition starts from, and in this embodiment is set to "6". If it is determined in step S5 that the stage count is N1, processing advances to step S6 and it is determined whether or not there is a stroke determination possible state. In the event that it is determined in step S4 that stroke determination is in progress, since the determination of step S5, constituting a trigger for commencing stroke determination, has already been carried out, step S5 is skipped and processing advances to step S6.

Figure 3:
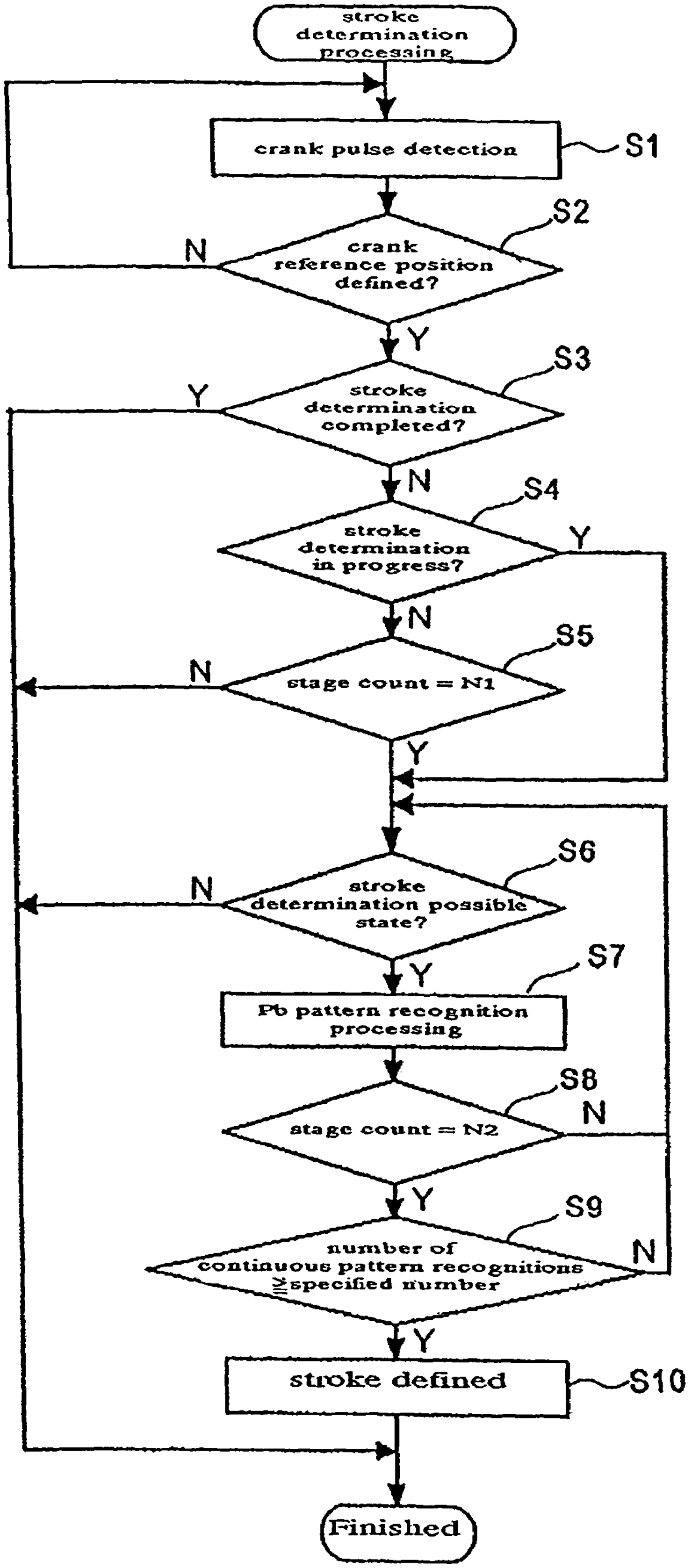
FIG. 3 is a flow chart showing a procedure for stroke determination processing.
Figure 5:
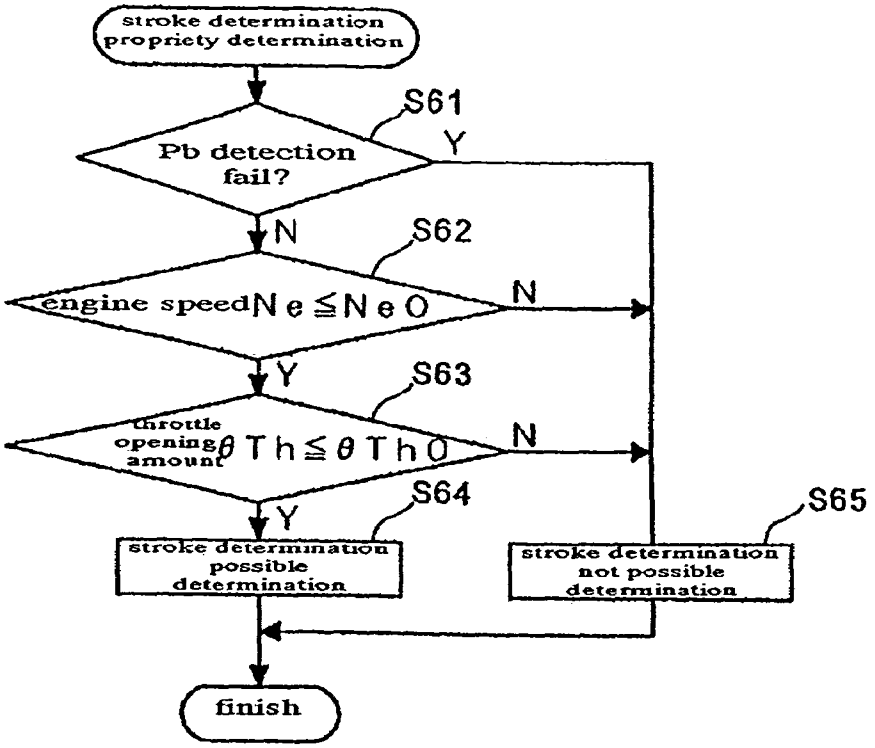
FIG. 5 is a flow chart showing a procedure for stroke determination propriety determination.

FIG. 5 shows processing which occurs during step S6 of the flowchart of FIG. 3, and is a flowchart (sub flow 1) of process for determining whether or not there is a stroke determination possible state. If step S6 is reached in the flowchart of FIG. 3, "stroke determination propriety determination" as shown in FIG. 5 is launched. In step S61, it is determined whether or not there is a Pb detection fail state where detection of Pb is not possible due to damage to the Pb sensor or the like, and if it is determined that there is no Pb detection fail state processing, advances to step S62. In step S62, it is determined whether or not the engine rotation speed Ne is less than or equal to a reference engine rotation speed Ne0. Ne0 is an upper limit value for the engine rotation speed at which stroke determination is possible, and if the engine rotation speed Ne is determined to be less than or equal to Ne0, processing advances to step S63. In step S63, it is determined whether or not throttle opening amount θTh is less than or equal to a reference throttle opening amount θTh0. θTh0 is an upper limit value for throttle opening amount at which stroke determination is possible. If the throttle opening amount θTh is determined to be less than or equal to θTh0 in step S63, processing advances to step S64. In step S64, it is determined that stroke determination is possible, "stroke determination propriety determination" is completed, and processing advances to step S7 of the main flow diagram shown in FIG. 3. In the event that processing advances to step S65, it is determined that stroke determination is not possible, and stroke determination is terminated with a return to the main flow diagram.

Returning to FIG. 3, in step S7, Pb pattern recognition processing is executed by the Pb pattern recognition section 505 within the ECU. In the following, description will be given of the details of Pb pattern recognition processing for recognizing a Pb pattern of combined intake pressure Pb in a specified stage count period as either "rising", "upward peak" or "undetermined".

Figure 6:
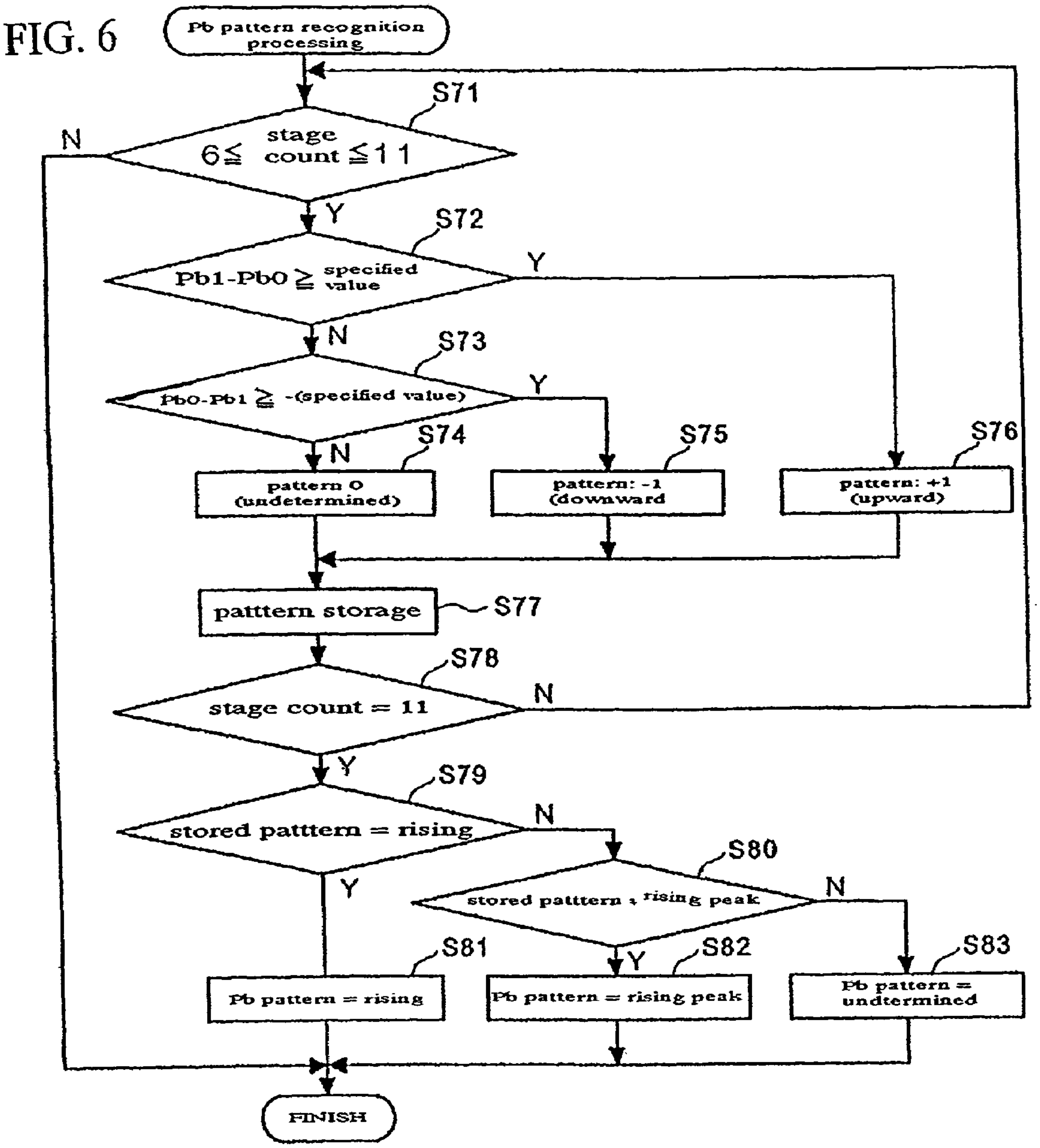
FIG. 6 is a flowchart showing a procedure for Pb pattern recognition processing relating to a first embodiment of the present invention.

FIG. 6 is a flowchart (sub flow 2) of Pb pattern recognition processing shown in step S7 of FIG. 3. In the flowchart, Pb pattern recognition processing relating to a first embodiment of the present invention will be described. If step S7 of FIG. 3 is reached, "Pb pattern recognition processing" as disclosed in FIG. 6 is launched. With the Pb pattern recognition processing, in order to recognize the Pb pattern, processing is carried out to recognize variation in the combined intake pressure Pb within every crank pulse generating period as a variation pattern. In step S71, it is determined whether or not the stage count is six or more and eleven or less in a specified stage count period of this embodiment, and if the stage count is determined to be six or more and eleven or less, processing advances to step S72.

In step S72, the value Pb0, which corresponds to a previously detected detection value for combined intake pressure Pb, is subtracted from Pb1, which corresponds to the current detection value for combined intake pressure, and then it is determined whether or not the difference between Pb1 and Pb0 is a specified value or greater. The specified value is a threshold value for determining whether or not there is change in the variation pattern, and is set taking into consideration the sensitivity of the Pb sensor.

If it is determined that Pb1−Pb0 is the specified value or greater, then in step S76 the variation pattern is determined to be increasing: upward (+1). Also, if it is determined in step S72 that Pb1−Pb0 is not the specified value or greater, processing advances to step S73, where it is determined whether or not Pb0−Pb1 is a negative specified value or greater. If Pb0−Pb1 is determined to be the negative specified value or greater the variation pattern is determined to be reducing: downward (−1) in step S75. In the event that the determination in steps S72 and S73 are negative, in step S74 the variation pattern is determined to be no change (0).

Continuing on, in step S77, the recognition results, that is, the variation patterns, are accumulated for each stage using a value of +1 to refer to an upward pattern, a value of −1 to refer t a downward pattern, and a value of 0 to refer to no change, and then processing then advances to step S78. In step S78, it is determined whether or not a stage count value is eleven, which is a stage count for terminating Pb pattern recognition. If the stage count is determined to be eleven in step S78, processing advances to step S79. In the event that the stage count is not eleven, processing returns to step S71, and the recognition processing of steps S71 to S78 is repeated until the stage count reaches eleven.

Next, Pb pattern matching processing of steps S79 and later will be described with reference to FIG. 7.

FIG. 7 is an example of a data map for Pb pattern recognition carried out in steps S79 and afterwards, and is stored in a Pb pattern map 506 (refer to FIG. 2). In FIG. 7(*a*), a signal pattern, that has stored variation patterns for each of the stages 6–11 that are all upward (+1), corresponds to signal pattern No. 0. As shown in FIG. 7(*b*), the Pb pattern is determined to be "rising". In addition, if the stored variation patterns correspond to one of the signal patterns shown in No.s 1–9, the Pb pattern is determined to be "upward peak", while if the patterns do not correspond to any of No.s 0–9, the Pb pattern is determined to be "undetermined". Depending on the Pb pattern recognition, compared to a method that compares a combined intake pressure value in a particular phase of a crankshaft, since recognition is performed with a pattern having continuity, the suppression of the effect of electrical noise is improved, and it is possible to carry out accurate stroke determination processing.

Returning to FIG. 6, if it is determined in step S79 that as a result of matching with the map of FIG. 7A that the stored pattern is "rising", processing advances to step S81 where the Pb pattern is defined as "rising". Also, if it is determined in step S79 to be not "rising", processing advances to step S80 where it is determined whether or not the stored pattern is "upward peak". If it is determined to be "upward peak" in step S80, processing advances to step S82 where the Pb pattern is defined as "upward peak". If it is determined to be not "upward peak" in step S80, processing advances to step S83 where the Pb pattern is defined as "undetermined".

If the Pb pattern is defined as one of either "rising", "upward peak" or "undetermined" as a result of the above described Pb pattern recognition processing, pattern recognition processing is terminated in step S84, and processing advances to step S8 of the main flow diagram of FIG. 3.

Figure 4:
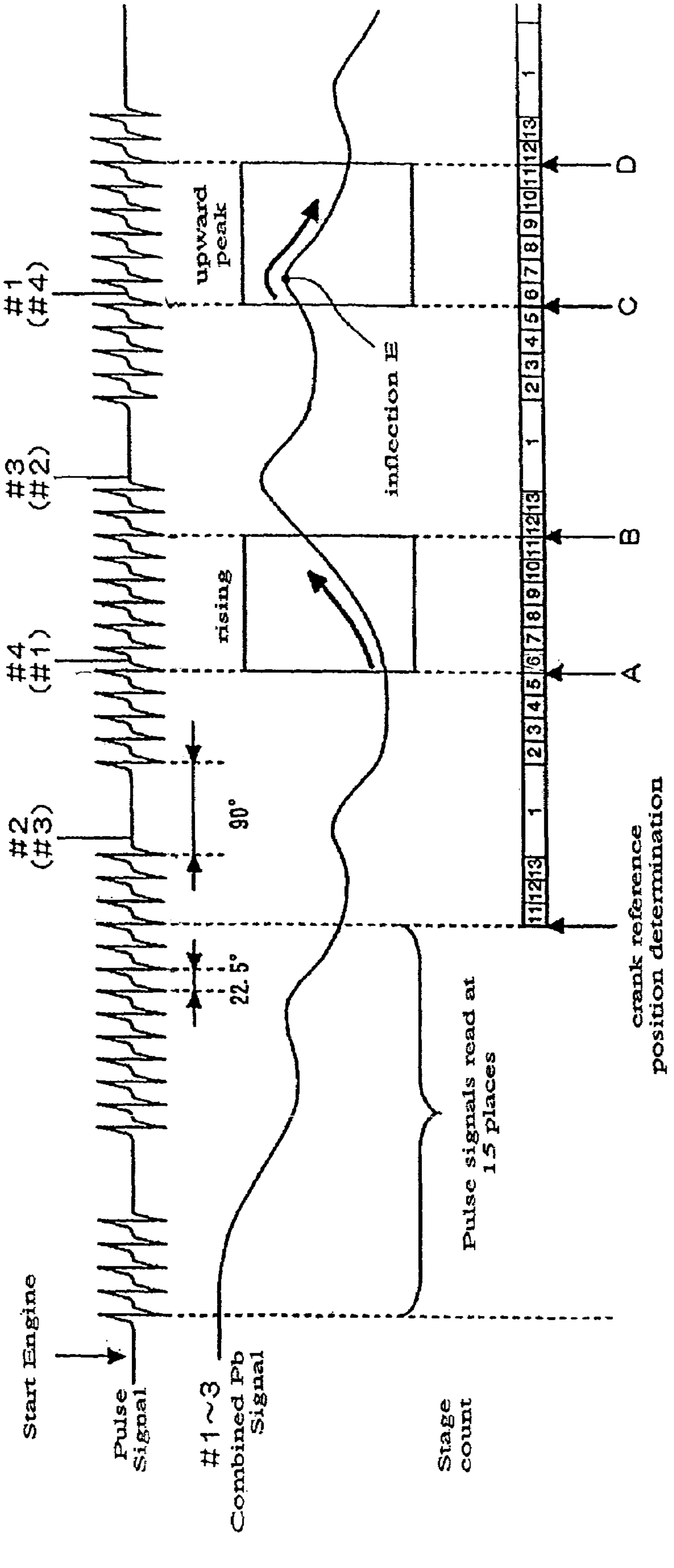
FIG. 4 is a timing chart showing a procedure for stroke determination processing.

As shown in the timing chart of FIG. 4, with this embodiment a Pb pattern between stage count section between A–B are defined as "rising", while a Pb pattern between C–D after one rotation of the crankshaft is defined as "upward peak". Continuing on after that, the Pb pattern is repeatedly and alternately defined as "rising" and "upward peak" as long as there is no change in operating state of the engine 1, such as being determined to be in a stroke determination not possible state in the "stroke determination propriety determination" of FIG. 5.

Returning to FIG. 3, it is determined in step S8 whether or not the stage count is N2. The value of N2 is a set value corresponding to the stage count at which the Pb pattern recognition finishes, and in this embodiment is set to "11". If it is determined in step 8 that the stage count is N2, processing advances to step S9 where it is determined whether or not the number of times recognition has been continuously performed for the Pb pattern has reached a specified number of times or greater. With this embodiment, the specified number of times is set to four times, and if pattern recognition is carried out a total of four times for a Pb pattern to yield "rising", "upward peak", "rising", "upward peak", processing advances to step S10 where a stroke is defined. If a stroke is defined in step S10, stroke determination processing is terminated.

In FIG. 4, top dead center for the first to fourth cylinders is shown by the symbol # on the line representing pulse signal. However, before the stroke is defined by the stroke determination processing, it is unclear which of the cylinder numbers inside the brackets (#), which has had a crankshaft phase recognized at a 360 degree angle on both sides, or the symbol #, showing top dead center, are correct. However, with the present invention, noting that a Pb combined waveform generated during the same stage count values 6–11 is clearly different between the first rotation (for example as seen between A and B) and the second rotation of the crankshaft (for example, as seen between C and D), by identifying this as a Pb pattern of "rising" or "upward peak", it is made possible to carry out accurate stroke determination.

In addition, selection of a start stage count period and a completion stage count period for Pb pattern recognition avoids a non-toothed section of the crank pulser rotor 2 for determining a reference position of the crankshaft, and takes into consideration stage count values which are not erroneously recognized as other Pb patterns, even if there is occurrence of slight delay in Pb detection time at times such as high speed operation of the engine. In FIG. 4, the fact that an inflection point E in the "upward peak" Pb pattern waveform is exhibited immediately after the Pb pattern recognition start stage count (6) is useful for period selection.

Figure 8A:
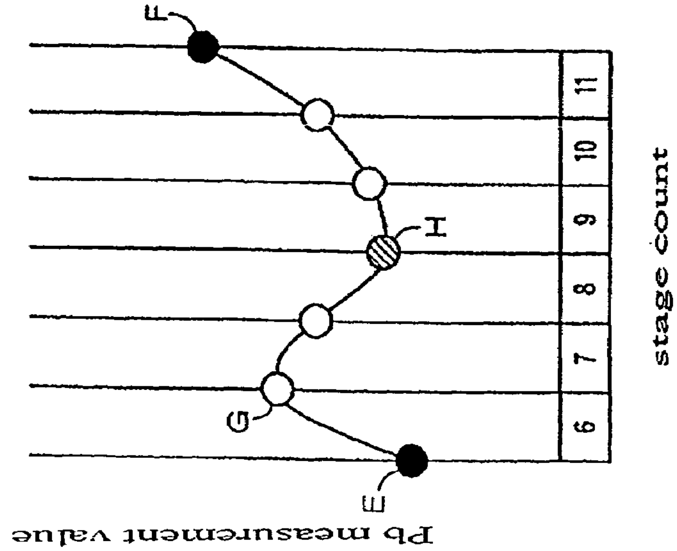
FIG. 8 is a schematic diagram for Pb pattern recognition processing relating to a second embodiment of the present invention.
Figure 8B:
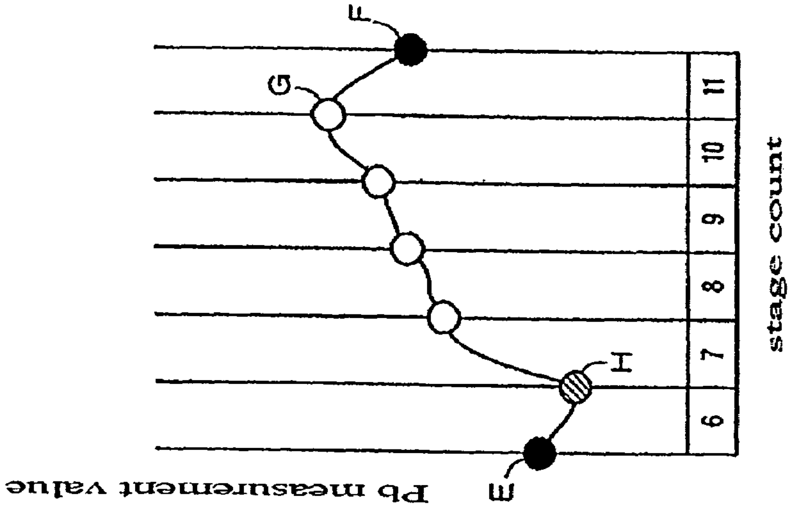
Figure 8C:
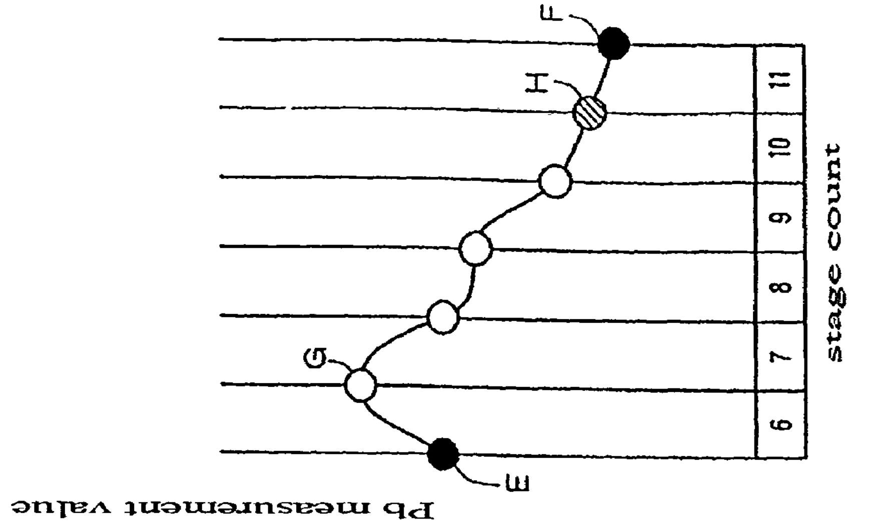

Referring to FIG. 8, a procedure for Pb pattern recognition processing relating to a second embodiment of the present invention will be described. Similar to the first embodiment described above, Pb pattern recognition processing is executed when step S7 in the flowchart of FIG. 3 is reached. In the second embodiment, first of all combined intake pressures Pb measured at seven points from stage counts 6 to 11 are stored. That is, the beginning value and ending value for each of six stages provides seven data points.

Next, from among measurement values for the seven measured points, the initial measured value is designated E point, the final measured value is designated F point, and among the 5 point remaining after removing the E point and F point, the maximum value is defined as G point while the minimum value is defined as H point. At this time, in the event that the "final measured value" is larger than the "initial measured value", and all "measurement values of the five remaining points" are between the "final measured value" and the "initial measured value", the Pb pattern is recognized as "rising". If this recognition condition is represented with an equation, it would become as follows:

$$\text{if } (F>E+10\text{ mV}) \text{ AND } (G \text{ and } H \geqq E-10\text{ mV}) \text{ AND } (G \text{ and } H \leqq F+10\text{ mV})$$

The condition equation is stored in the Pb pattern map 506 within the ECU 5. Using the above-described method, with the example shown in FIG. 8, FIG. 8(*a*) is recognized as a "rising" Pb pattern. With the condition equation, the fact that 10 mV is being added or subtracted is to prevent erroneous recognition of a Pb pattern due to error of the Pb sensor 4.

Next, Pb recognition for "upward peak" is carried out in the event that a "maximum value of the five remaining points" is larger than any of the "final measured value" and the "initial measured value", namely, represented as an equation, (G>E+10 mV) AND (G>F+10 mV). Using the above described method, with the example shown in FIG. 8, FIG. 8(*b*) and FIG. 8(*c*) are recognized as a "upward peak" Pb patterns.

As a result of the above described pattern recognition, it becomes possible to prevent erroneous Pb pattern recognition, even if contamination such as leakage due to noise in the electrical system etc. has a slight influence on the Pb sensor output values. In this embodiment, if attention is paid to the waveform using the combined intake pressure shown in FIG. 8(*a*) and FIG. 8(*b*), the G point of FIG. 8(*a*) and the H point of FIG. 8(*b*) can be respectively speculated to be measurement values due to contamination such as noise. If data containing this type of noise is collated with a data table shown in FIG. 7 of the first embodiment, they will not correspond to any pattern, and there is a possibility of determining all Pb patterns to be "undetermined". However, as a result of the Pb pattern recognition of the second embodiment, since fluctuation in intake pressure measurement values speculated as being caused by noise etc. is made negligible, accurate stroke determination that is not affected by slight noise is made possible.

Figure 9A:
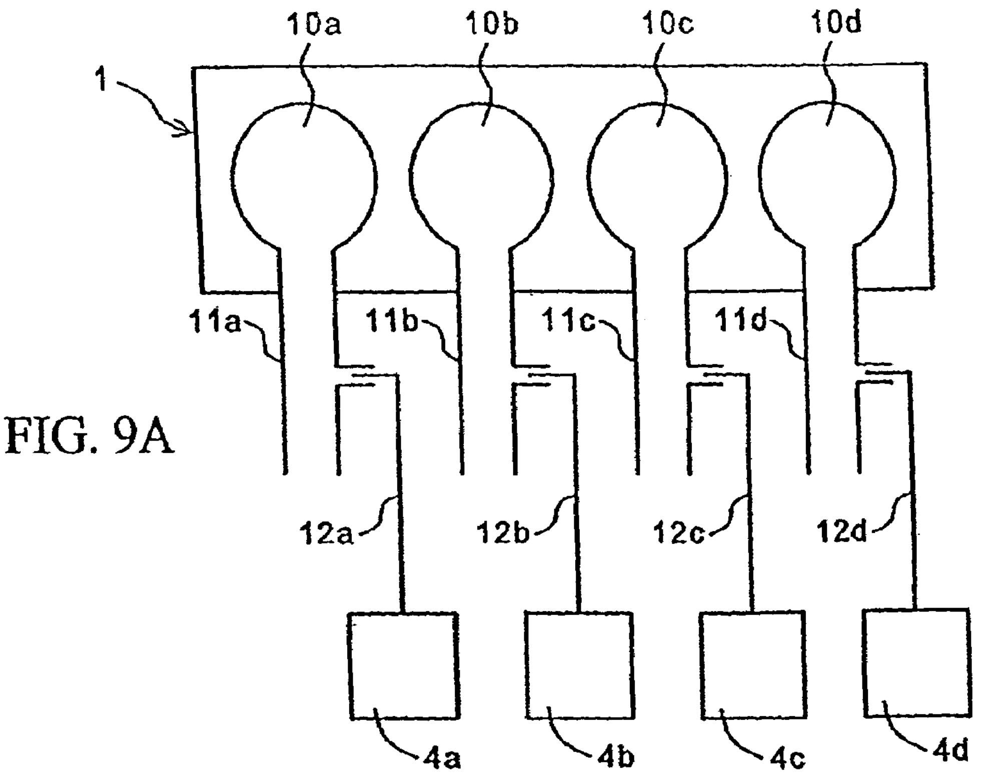
FIG. 9A is a schematic diagram of another engine and an intake pressure sensor suitable for use in the present invention.
Figure 9B:
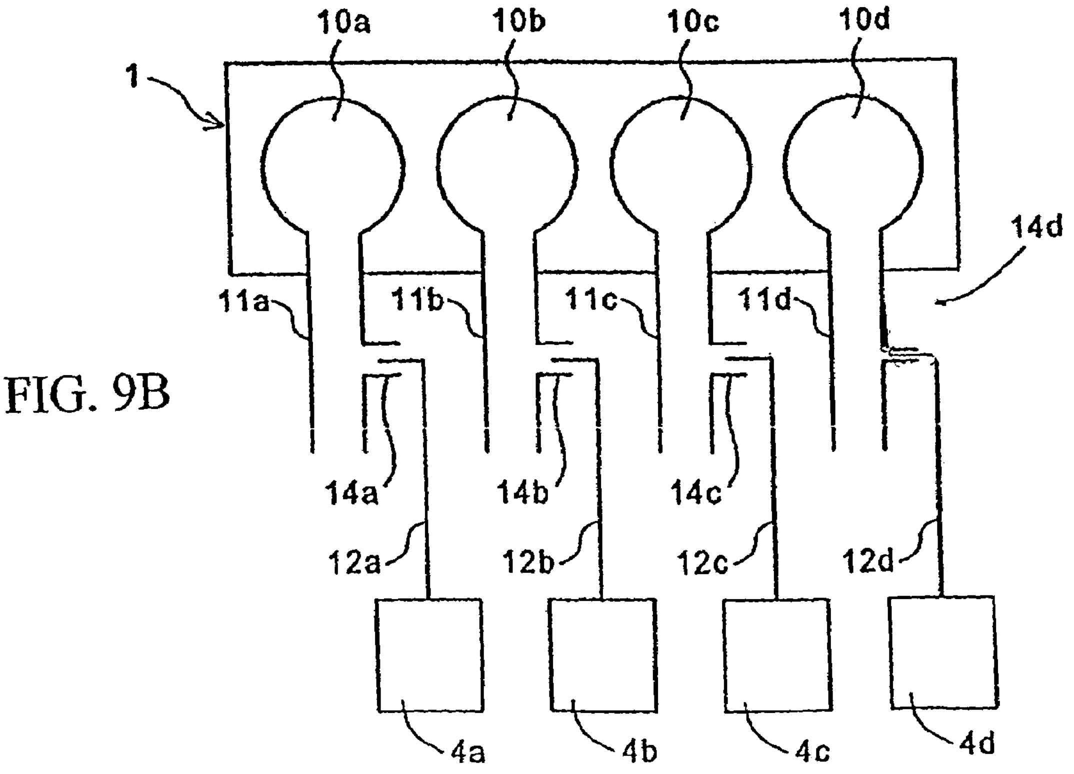
FIG. 9B is a schematic diagram of another engine and an intake pressure sensor suitable for use in the present invention.
Figure 10:
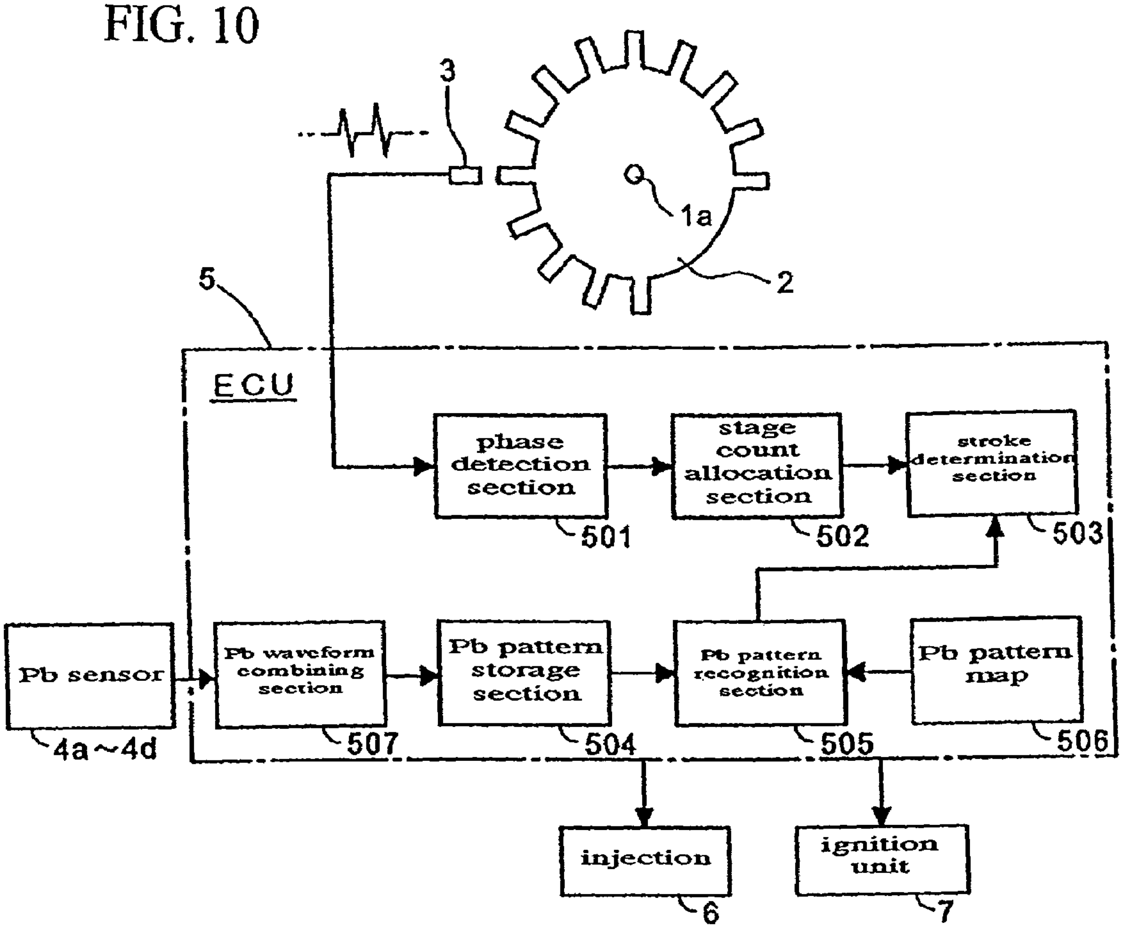
FIG. 10 is a block diagram of another embodiment of a stroke determination unit for an engine of the present invention.

FIG. 9 and FIG. 10 are respectively a schematic explanatory drawing of another engine and intake pressure sensor suitable for use in the present invention, and a block diagram of a stroke determination unit suitable for use with this engine. With this embodiment, as shown in FIG. 9(*a*), Pb sensors 4*a*–4 *d* are provided in each of first to fourth cylinders. Also, as shown in FIG. 9(*b*), among jet nozzles 14*a*–14*d* connecting the intake pipes 11*a*–11*d* and the capillaries 12*a*–12*d*, only the jet nozzle 14*d* of the fourth cylinder has a smaller diameter than the rest, changing the sensitivity of the Pb sensor 4*d*.

FIG. 10 is a block diagram of a stroke determination unit in the case where the engine Pb sensors have the structure of FIGS. 9A and 9B. A Pb waveform-combining section 507 is added to the ECU 5 of FIG. 2. The Pb waveform-combining section 507 corresponds to an intake pressure change generating device, and is a means for forming a waveform of combined intake pressure Pb from output values of the Pb sensors 4*a*–4*d*. With the structure of FIG. 9(*a*) the output values of three Pb sensors 4*a*–4*c* are combined, while with the structure of FIG. 9(*b*) the output values of four Pb sensors 4*a*–4*d* are combined, to form respective combined intake pressure waveforms.

As has been described above, according to the present invention, since variation in a combined intake pressure waveform is recognized using a waveform pattern, suppression of the effect of electrical noise is improved and accurate stroke determination processing is made possible. Also, since only a pattern of a particular period having a feature is recognized in a combined intake pressure waveform, it is possible to reduce the computing load on a computer due to pattern recognition as compared to a method that carries out recognition processing in all periods of the crankshaft.

With the above described embodiments, a description has been given relating to application of the invention to a four-cycle multiple cylinder engine where all cylinders fire at regular intervals, but obviously it is also possible to apply the invention to a four cycle multiple cylinder engine having irregular firing intervals.

While a working example of the present invention has been described above, the present invention is not limited to the working example described above, but various design alterations may be carried out without departing from the present invention as set forth in the claims.

What is claimed is:

1. A stroke determination unit for a multiple cylinder, 4-cycle engine, said stroke determination unit comprising:

a crank angle detection device for detecting an angular position of a crankshaft, an intake pressure detection device for detecting respective intake pressures corresponding to each of a plurality of the multiple cylinders, an intake pressure variation generating device for causing variation so that an intake pressure waveform of at least one cylinder becomes different relative to the intake pressure waveforms of other cylinders;

an intake pressure waveform combining device for combining detected intake pressure waveforms;

a pattern recognition device for recognizing a pattern of the detected intake pressure waveform; and a stroke determination device for determining a stroke of each cylinder using the crankshaft position and a recognized pattern.

2. The stroke determination unit for a 4-cycle engine of claim 1, wherein the pattern recognition device is operable to recognize a pattern in a specified crankshaft phase period.

3. The stroke determination unit for a 4-cycle engine of claim 2, wherein the specified crankshaft phase period is set so that an inflection point of the combined intake pressure waveform approximately corresponds to a start time of the specified crankshaft phase period.

4. The stroke determination unit for a 4-cycle engine of claim 1, wherein the multiple cylinder 4-cycle engine fires at regular intervals and has expansion strokes which occur at equal time spacings, and the intake pressure variation generating device does not add an intake pressure waveform for a particular cylinder to an combined intake pressure waveform.

5. The stroke determination unit for a 4-cycle engine of claim 4, wherein detection of intake pressure for the particular cylinder is not carried out, and one of fuel injection and ignition timing control is performed based on intake pressure detected for cylinders other than the particular cylinder.

6. The stroke determination unit for a 4-cyclce engine of claim 1, wherein the intake pressure variation generating device comprises intake pressure detection for a particular cylinder using a sensor of different sensitivity than that of the intake pressure detection devices provided for each of the other cylinders.

7. The stroke determination unit for a 4-cycle engine of claim 1, wherein the pattern recognition device identifies a fluctuation in the combined intake pressure waveform for every crank pulse generation period as one of increase, decrease and change, and recognizes a pattern of the combined intake pressure waveform using the fluctuation result.

8. The stroke determination unit for a 4-cycle engine of claim 1, wherein the pattern recognition device stores a plurality of intake pressure values including start time intake pressure value and an end time intake pressure value of the specified crankshaft phase period, and recognizes a pattern of the combined intake pressure waveform from a relationship between the intake pressure values at the start time and the end time, and other intake pressure values within that range.

9. The stroke determination unit for a 4-cycle engine of claim 1, wherein the engine comprises n cylinders, and each of the n cylinders comprises an air intake pipe, and wherein the intake pressure variation generation device is comprised such that each air intake pipe comprises a capillary extending from the air intake pipe, the capillaries of the first through $(n-1)^{th}$ cylinders are merged together to form a combined capillary at a location distant from the respective cylinders, and the combined capillary is operatively connected to a combined intake pressure sensor whereby the combined intake pressure sensor senses the sum of the intake air pressure of each of the intake pipes corresponding to the first through $(n-1)^{th}$ cylinders.

10. The stroke determination unit for a 4-cycle engine of claim 1, wherein the crank angle detection device comprises a pulsar rotor provided on the crankshaft, and a pulse generator disposed adjacent to a peripheral edge of the pulsar rotor, wherein a plurality of regularly spaced teeth are formed about the peripheral edge of the pulsar rotor, the peripheral edge of the pulsar rotor comprising a non-toothed portion that extends over approximately a 90 degree range of the peripheral edge of the pulsar rotor, wherein the pulsar rotor rotates in accord with the crankshaft, and the pulse generator outputs a pulse to the stroke determination device each time a tooth passes a sensing face of the pulse generator.

11. The stroke determination unit for a 4-cycle engine of claim 1, wherein the pattern recognition device stores a plurality of intake pressure values including start time intake pressure value and an end time intake pressure value of the specified crankshaft phase period, and recognizes a pattern of the combined intake pressure waveform from a relationship between the intake pressure values at the start time and the end time, and other intake pressure values within that range, the other intake pressure values comprising a maximum intake pressure value, and a minimum intake pressure value, wherein when (end time intake pressure value>start time intake pressure value+10 mV) AND (maximum intake pressure value and minimum intake pressure value≧start time intake pressure value−10 mV) AND (maximum intake pressure value and minimum intake pressure value≦end time intake pressure value+10 mV), the pattern is recognized to be rising, and when (maximum intake pressure value>start time intake pressure value+10 mV) AND (maximum intake pressure value>end time intake pressure value+10 mV), the pattern is recognized to be an upward peak.

12. The stroke determination unit for a 4-cycle engine of claim 1, wherein the engine comprises n cylinders, and each of the n cylinders comprises an air intake pipe, and wherein the intake pressure variation generation device is comprised such that each air intake pipe comprises a capillary extending between the air intake pipe and a pressure sensor dedicated to that air intake pipe, the output of each pressure sensor is received by the waveform combining device, and the waveform combining device combines the output values of pressure sensors corresponding to the intake pipes of the first through $(n-1)^{th}$ cylinders.

13. The stroke determination unit for a 4-cycle engine of claim 1, wherein the engine comprises n cylinders, and each of the n cylinders comprises an air intake pipe, and wherein the intake pressure variation generation device is comprised such that each air intake pipe comprises a capillary extending between the air intake pipe and a pressure sensor dedicated to that air intake pipe, the pressure sensor of the $n^{th}$ air intake pipe having a different sensitivity relative to the pressure sensors of the remaining air intake pipes, the output of each pressure sensor is received by the waveform combining device, and the waveform combining device combines the output values of the pressure sensors corresponding to the intake pipes of the first through n cylinders.

14. A method of determining the stroke of an engine using a stroke determination unit, the engine comprising multiple-cylinders, a crankshaft, and four-cycle operation, the stroke determination unit comprising a crank angle detection device for detecting a stage of a crankshaft, the crank angle detection device configured to segment a single revolution of the crankshaft into plural stages, an intake pressure detection device for detecting an intake pressure of each of the multiple cylinders, an intake pressure variation generating device for causing variation so that an intake pressure waveform of at least one cylinder becomes different relative to the intake pressure waveforms of other cylinders;

an intake pressure waveform combining device for combining detected intake pressure waveforms to form a combined intake pressure waveform;

a pattern recognition device for recognizing a pattern of the detected intake pressure waveform; and a stroke determination device for determining a stroke of each cylinder using the crankshaft phase and a recognized pattern, wherein the method comprises the following method steps:

detecting a stage of the crankshaft using the crank angle detection device;

defining a crank reference position;

setting a stage count to a value corresponding to a stage associated with an inflection point of the combined intake pressure waveform;

specifying a stage count period which begins from the stage that corresponds to the stage count value;

recognizing a pattern of the combined intake pressure for each stage within the stage count period based on combined input pressures, which form the combined intake pressure waveform, recognizing a pattern of the combined intake pressure of the specified stage count period; and defining the stroke based on the recognized pattern of the combined intake pressure of the specified stage count period.

15. The method of claim 14, wherein the method step of recognizing a pattern of the combined intake pressure of the specified stage count period is based on a pattern recognition data map.

16. The method of claim 14, wherein a plurality of intake pressure values, including a start time intake pressure value and an end time intake pressure value of the specified stage count period are stored, and wherein the method step of recognizing a pattern of the combined intake pressure of the specified stage count period is based on a relationship between the intake pressure values at the start time and the end time, and on other intake pressure values within that range.

17. The method of claim 14, wherein the pattern recognition device recognizes a pattern in a specified crankshaft phase period.

18. The method of claim 17, wherein the specified crankshaft phase period is set so that an inflection point of a combined intake pressure waveform approximately corresponds to a start time of the specified crankshaft phase period.

* * * * *